United States Patent [19]

Neft

[11] Patent Number: 4,685,049
[45] Date of Patent: Aug. 4, 1987

[54] UNRESTRICTED FREQUENCY CHANGER SWITCH TOPOLOGY

[75] Inventor: Charles L. Neft, Murrysville Boro, Pa.

[73] Assignee: Westinghouse Electric Corp., Pittsburgh, Pa.

[21] Appl. No.: 888,666

[22] Filed: Jul. 22, 1986

[51] Int. Cl.[4] .............................................. H02M 5/22
[52] U.S. Cl. ..................................... 363/159; 363/160
[58] Field of Search ................ 363/159, 160, 161, 163

[56] References Cited

U.S. PATENT DOCUMENTS

| | | | |
|---|---|---|---|
| 3,470,447 | 9/1969 | Gyugyi et al. | 363/160 |
| 3,493,838 | 2/1970 | Gyugyi et al. | 363/160 |
| 4,488,216 | 12/1984 | Gyugyi et al. | 363/160 |
| 4,581,696 | 4/1986 | Gyugyi et al. | 363/161 |

Primary Examiner—Patrick R. Salce
Assistant Examiner—Jeffrey Sterrett
Attorney, Agent, or Firm—C. M. Lorin

[57] ABSTRACT

The N converters of a UFC bridge system interconnecting an N-phase voltage source to N output loads, comprise each N bilateral switches connected to one end of the associated output load and (N−1) bilateral switches connected to the other end thereof. The (N−1) bilateral switches of the respective converters build up a polygonal assembly between the output loads which is selectively connected to the respective phases of the voltage source by selective control of the N groups of N switches and of the (N−1) groups of switches.

7 Claims, 12 Drawing Figures

UNRESTRICTED FREQUENCY CHANGER SWITCH TOPOLOGY

BACKGROUND OF THE INVENTION

The Unrestricted Frequency Changer, also called Unrestricted Frequency Converter, is known as a static "artificially" commutated frequency converter with variable output voltage. The UFC has been described in the context of a variable speed AC motor drive in U.S. Pat. Nos. 3,470,447 and 3,493,338 of Gyugyi.

The Unrestricted Frequency Changer, when compared to other static power converters, has significant advantages that make it particularly suitable for providing variable frequency electric power to control the speed of ac motors. These advantages are as follows:

1. Single stage power conversion with bidirectional power flow (i.e., power can flow either to, or from, the load). This permits regenerative braking of the motor.

2. A wide output frequency range, not limited by the input (supply) frequency. Therefore, the generated output frequency can be lower, higher, or equal to the input frequency.

3. The frequency spectrum of the output waveform is independent of the amplitude of the wanted fundamental component. Furthermore, the frequencies of the "unwanted" (harmonic) components in the output waveform are widely separated from the fundamental frequency over the total output frequency range. The separation of the harmonic frequencies from the fundamental increases "naturally" (i.e. without changing the method of output voltage waveform construction) as the fundamental output frequency decreases. Thus, the frequencies of the harmonic currents in the motor remain high relative to the fundamental, even at low speeds so that the motor runs without cogging.

4. The lagging (inductive) motor displacement (power) factor results in leading (capacitive displacement (power) factor (with equal phase angle) at the ac supply. Unity output displacement factor is reflected back to the ac supply without change.

5. Simple control. The output frequency and voltage can be controlled by two appropriately displaced pulse trains, both having the same even rate.

The prior art on Unrestricted Frequency Changer motor drives is described in the afore-stated U.S. patents. It involves three identical bidirectional converter power circuits supplying the three stator windings of the motor, with a gating logic generating the electrical signals to turn on and off the bilateral switching devices of the power converters, while pulse trains in response to external analog signals determine the output frequency and voltage applied to the motor. These two pulse trains are so coordinated that the output voltage increases with increasing output frequency in order to maintain an essentially constant air-gap flux in the motor.

The present invention resides in a topology for the bridge version of the unrestricted frequency changer which allows a reduction of the number of bilateral switches necessary in the operation and control of the converters. In this respect advantage is taken from the situation where the output voltage is symmetrically controlled, as the case is, for instance with an AC motor drive.

SUMMARY OF THE INVENTION

In a bridge UFC interconnecting an N-phase voltage source to N symmetrically disposed output loads through N converters, each converter includes N bilateral switches connected to one end of the associated output load and (N−1) bilateral switches connected to the other end thereof. The (N−1) bilateral switches of each converter build-up a polygonal assembly between the output loads which is selectively connected to the respective phases of the voltage source by selective control of the N groups of N switches formed by the N converters.

The bridge UFC system according to the invention is applicable to a UFC motor drive.

DETAILED DESCRIPTION OF THE INVENTION

Although the invention is applicable more generally to a UFC system, it will be described hereinafter in the context of a UFC motor drive.

Figure 1:
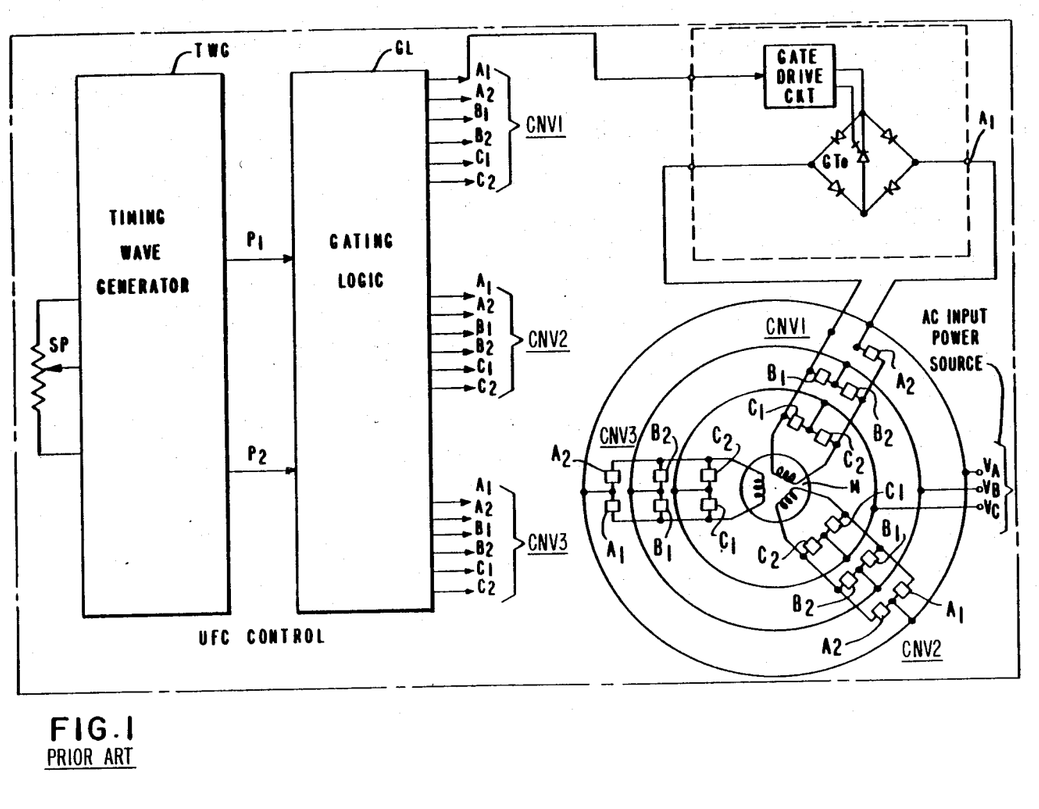
FIG. 1 is an overall view of a UFC motor drive as shown in U.S. Pat. No. 3,493,838 or 3,470,447.
Figure 2:
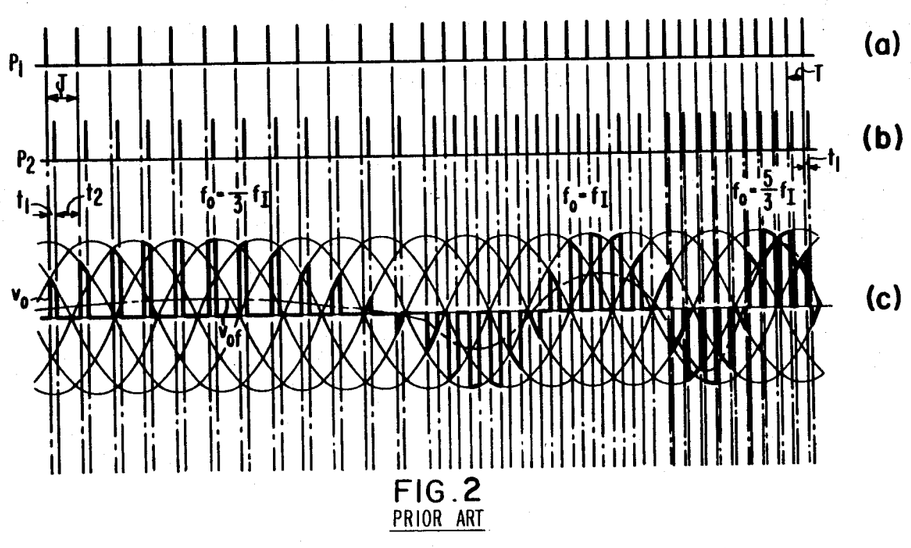
FIG. 2 shows curves relating the control pulses $P_1$, $P_2$ and the output voltage in the UFC of FIG. 1.

Referring to FIG. 1, an Unrestricted Frequency Changer motor drive system known in the prior art, consists of three identical bidirectional converter power circuits (CNV1, CNV2, CNV3) supplying the three stator windings A, B, C of a motor MT, of a gating logic GL generating control signals to turn ON and OFF the switching devices (A1, A2, B1, B2, C1, C2) of the power converters, and a timing wave generator TWG providing two pulse trains $P_1$, $P_2$ in response to external analog signals which determine the output frequency and the voltage applied to the motor. The relationship between the two control pulse trains and the output voltage of the UFC is illustrated by the waveforms shown in FIG. 2. Pulse train $P_1$ by its frequency of occurrence determines the output frequency and pulse train $P_2$ by its delay after $P_1$ determines the amplitude of the fundamental output voltage. The two pulse trains are so coordinated that the output voltage increases with increasing output frequency in order to maintain an essentially constant air-gap flux in the motor. For the purpose of disclosure, the Gyugyi U.S. Pat. No. 3,493,838 and 3,470,447 are hereby incorporated by reference.

Figure 3:
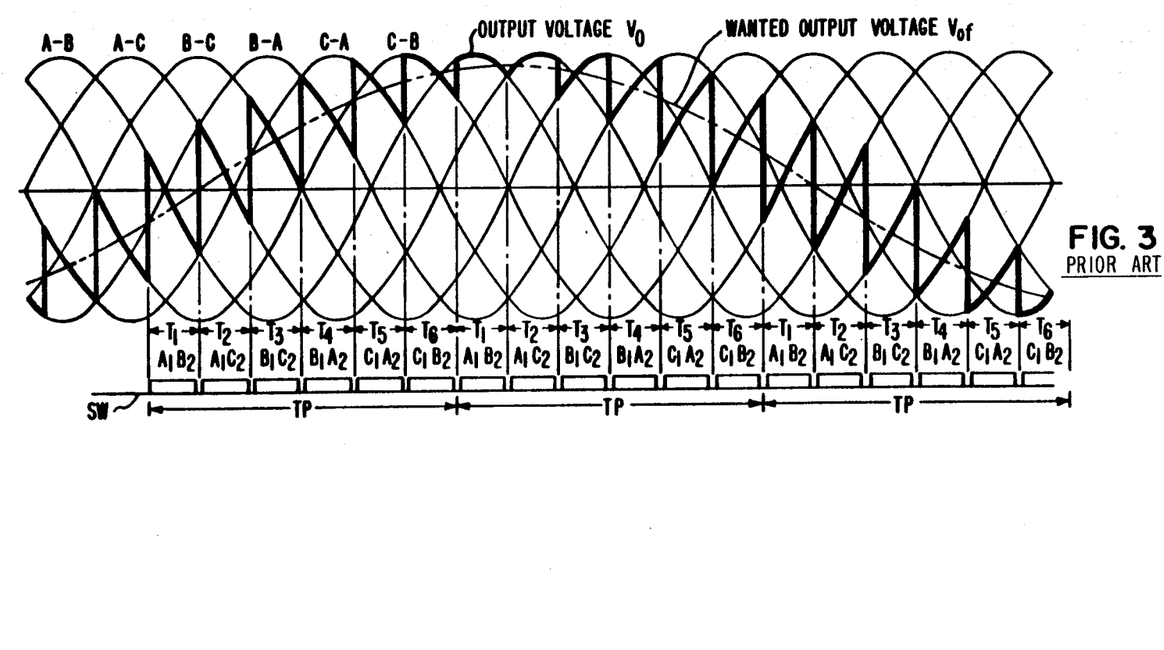
FIG. 3 shows as in FIG. 2 the construction of the output voltage in relation to the conduction interval, for one converter illustrated in FIG. 3A.
Figure 3A:
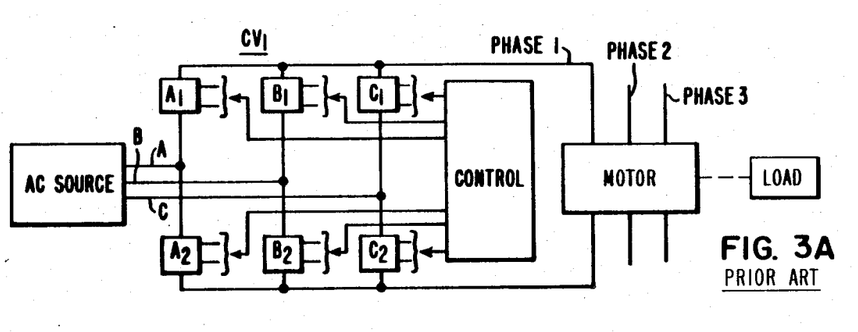
Figure 4:
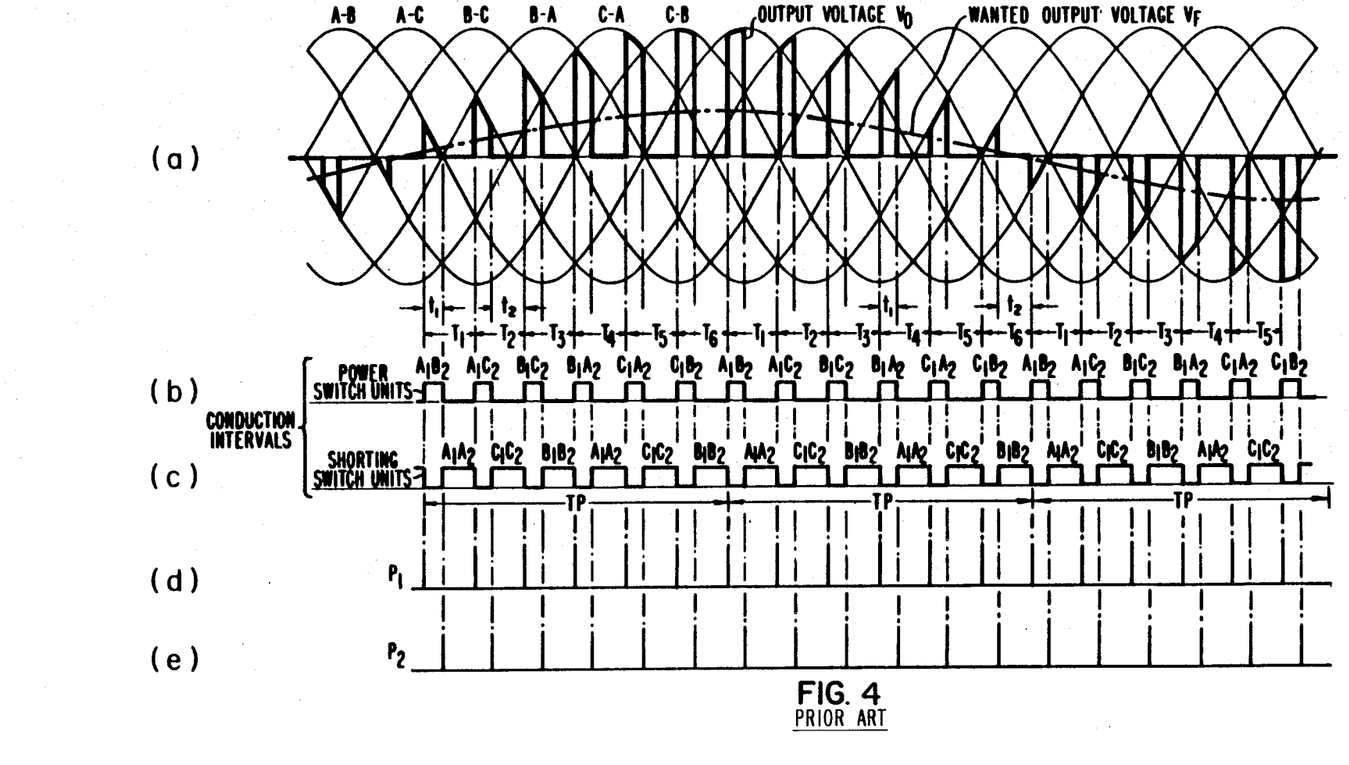
FIG. 4 illustrates the effect of a duty cycle within each sampling time interval due to short circuiting the output phase.

The basic operating principles of a UFC are illustrated by the waveforms shown in FIGS. 3 and 4 for one converter, and the associated one of the three outputs A, B, C. According to the teachings of the prior art, the basic output voltage waveform of the UFC, without means for controlling the magnitude of the fundamental component, can be generated by allowing the paired switching units $A_1B_2$, $A_1C_2$, $B_1C_2$, $B_1A_2$, $C_1A_2$, $C_1B_2$ to conduct in that sequence for a fixed period of time T, so that each of the input line voltages is in turn connected across the load for the same period of time, the sequence being repeated at a predetermined repetition rate. As illustrated in FIG. 3, this repetitive switching pattern extends over a time period TP defined by the succession of the consecutive time frames T, individually indicated at $T_1$, $T_2$, $T_3$, $T_4$, $T_5$, and $T_6$. This switching pattern provides an output voltage wave $V_O$ having a "wanted" fundamental component $V_F$ with a frequency $f_O$ equal to the difference between the AC supply frequency $F_{IN}$ and the repetition frequency $f_{SW}$ of the switching pattern.

Referring now to FIG. 4, the operation of the prior art power converter, with its means for controlling the fundamental output voltage, is characterized by a repetitive switching pattern extending over the time period TP defined by the six uniformly spaced time frames T labeled $T_1$ through $T_6$. In time frame $T_1$ power switches $A_1$ and $B_2$ are turned ON for a time interval $t_1$. At the end of the interval $t_1$, switches $A_1$ and $A_2$ are turned ON for a duration $t_2$ to short the load, thereby providing a path for the load current. In the next time frame $T_2$, switches $A_1$ and $C_2$ are turned ON for the same duration $t_1$ to apply an increment of input voltage $V_{AC}$ to the load. At the end of interval $t_1$ of time frame $T_2$, switches $A_1$ and $C_2$ are turned OFF and switches $C_1$ and $C_2$ are turned ON for the duration of interval $t_2$ of the same time frame, thereby to short the load. The overall switching pattern appears from the sequence shown in FIG. 4. Pulse train $P_1$ defines the time frame T, thus, the output frequency of the fundamental, or wanted output voltage $V_F$, whereas pulse train $P_2$ defines the relative length of intervals $t_1$ and $t_2$, in the given time frame T, and thus determines the amplitude of the fundamental component $V_F$.

Figure 5:
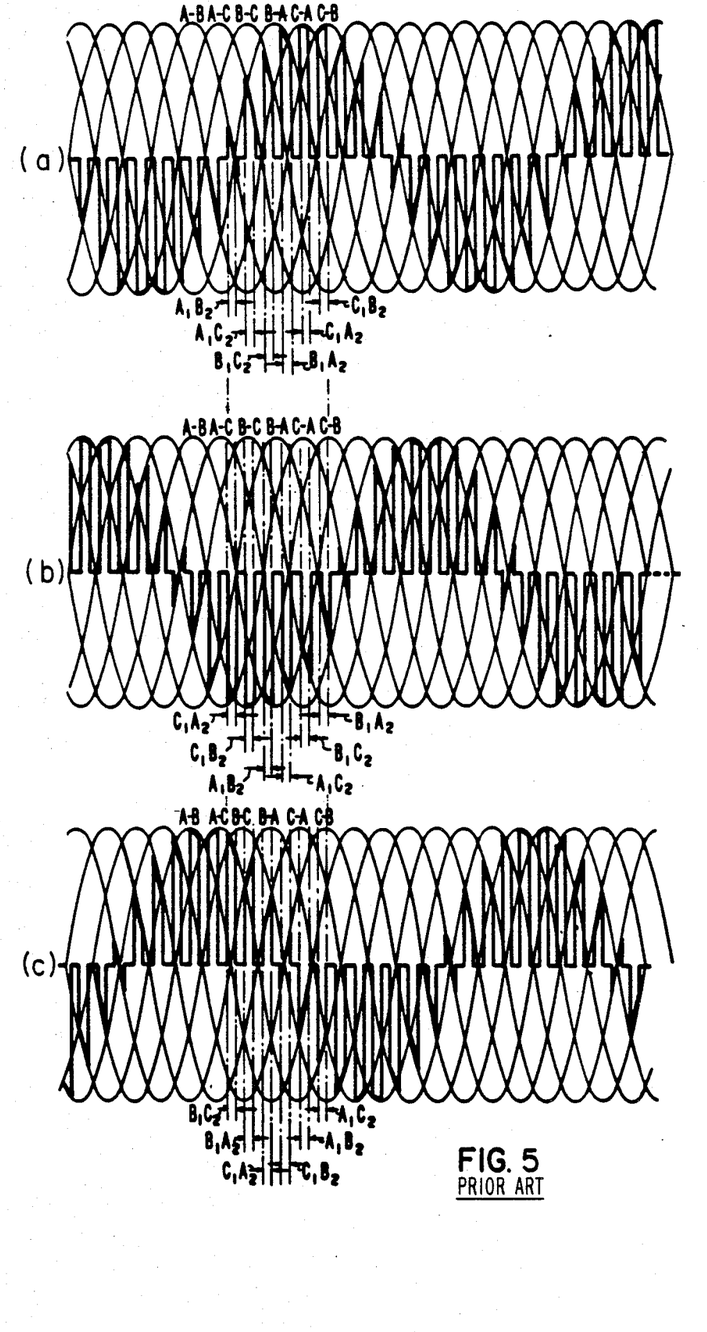
FIGS. 5A, 5B, and 5C show the relation between three phases in the situation of FIG. 1, for the three converters illustrated in FIG. 5A.
Figure 6:
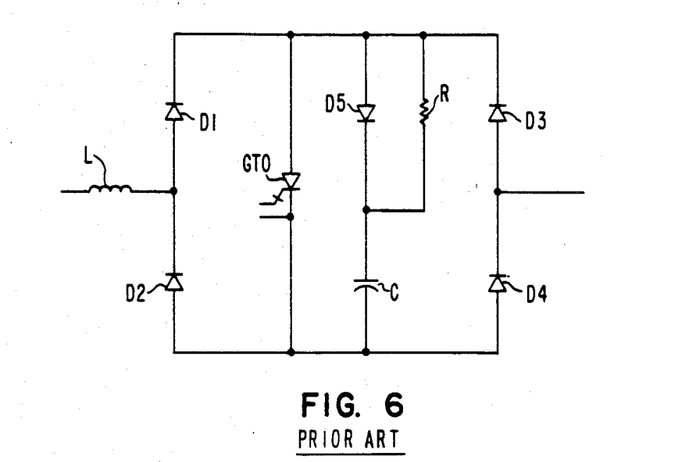
FIG. 6 shows a typical bilateral switch which is a GTO based with its auxiliary components.

The switching pattern of a complete three-phase bridge UFC is shown in FIG. 5. One of the disadvantages of the prior art arrangement just mentioned is the relatively large number of switches required. For an N-phase input, N-phase output, bridge UFC switches are required. Further, each switch is relatively complicated since it must presently be built of discrete components. A typical AC switch is shown in FIG. 6. Each bilateral switch utilizes a GTO or other suitable device as the controllable element which is embedded in a rectifier bridge (D1-D4). A snubber circuit (D5, R, C) and a dI/dt limiting reactor are also typically required. In conjunction with the components just shown, other elements such as a gate drive circuit, a heatsink, etc. are also required. Other switch arrangements are possible bit would have about the same complexity. Therefore, reducing the number of bilateral switches will be advantageous in any UFC system.

Where the output phases are controlled in a symmetrical fashion as is normally the case for an AC motor drive, as shown hereinafter, it is possible to reduce the number of AC switches required.

Figure 7:
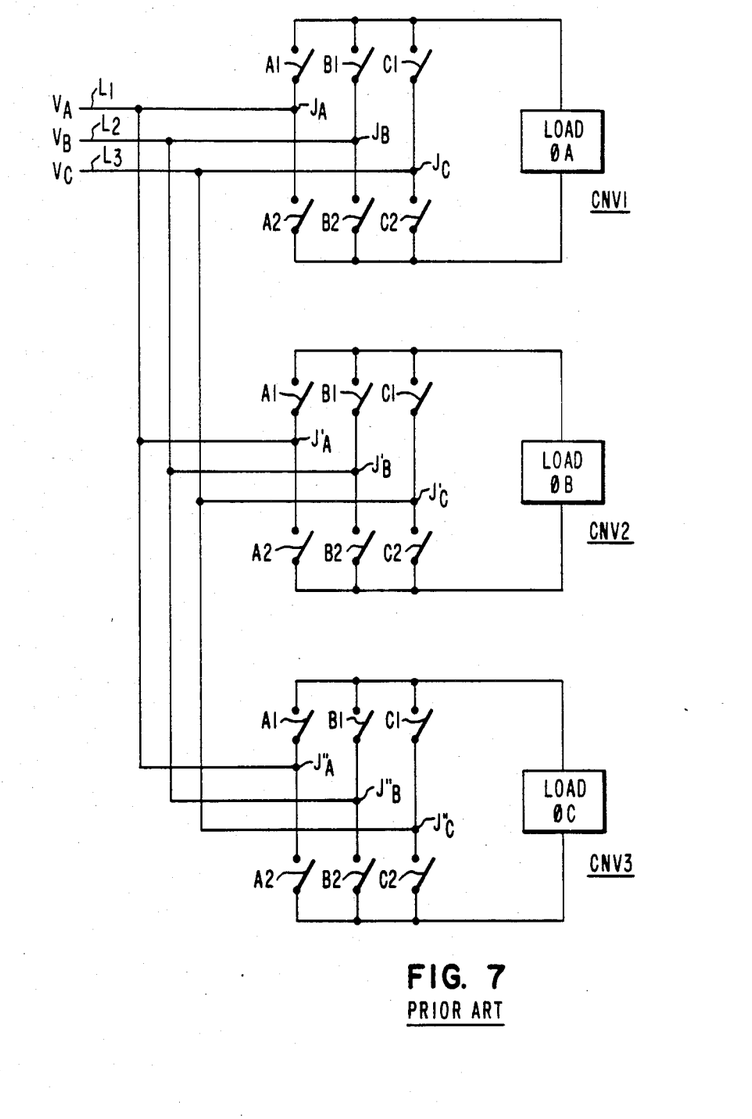
FIG. 7 illustrates the prior art topology of 2N bilateral switches per converter.

Referring to FIG. 7 the three converters CNV1, CNV2 and CNV3 of the prior art UFC of FIG. 1 are shown, each as a three-phase bridge circuit in which six switches $A_1$, $A_2$, $B_1$, $B_2$ and $C_1C_2$ are associated with the three input lines going to the associated converter. The switching sequence is, for instance, $(A_1B_2)$; $(A_1C_2)$; $(B_1C_2)$; $(B_1A_2)$; $(C_1A_2)$ and $(C_1B_2)$. This sequence is valid for each of the three bridges, with the difference that there is a 120° phase shift between the sequences from one bridge to the next, while each conduction period (assuming no short-circuiting within the time interval T) lasts 60 degrees.

The following table shows the entire sequence and the associated load voltages:

TABLE I

|      | $T_1$ | $T_2$ | $T_3$ | $T_4$ | $T_5$ | $T_6$ |
|------|-------|-------|-------|-------|-------|-------|
| CNV1 | $A_1B_2$ | $A_1C_2$ | $B_1C_2$ | $B_1A_2$ | $C_1A_2$ | $C_1B_2$ |
| CNV2 | $C_1A_2$ | $C_1B_2$ | $A_1B_2$ | $A_1C_2$ | $B_1C_2$ | $B_1A_2$ |
| CNV3 | $B_1C_2$ | $B_1A_2$ | $C_1A_2$ | $C_1B_2$ | $A_1B_2$ | $A_1C_2$ |
| φA   | $V_{AB}$ | $V_{AC}$ | $V_{BC}$ | $V_{BA}$ | $V_{CA}$ | $V_{CB}$ |
| φB   | $V_{CA}$ | $V_{CB}$ | $V_{AB}$ | $V_{AC}$ | $V_{BC}$ | $V_{BA}$ |
| φC   | $V_{BC}$ | $V_{BA}$ | $V_{CA}$ | $V_{CB}$ | $V_{AB}$ | $V_{AC}$ |

For a N-phase input and a N-phase output, the prior art approach requires $2N^2$ bilateral switches.

Figure 8:
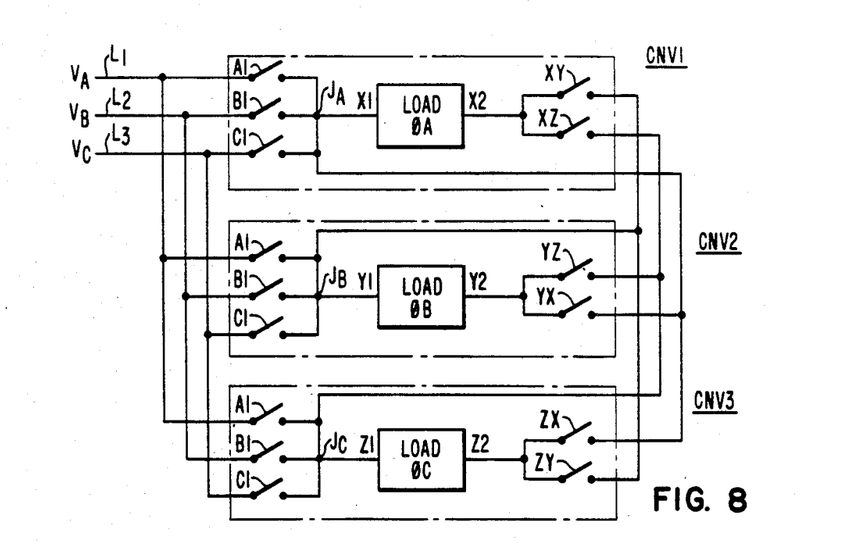
FIG. 8 shows the topology according to the present invention using only $2N^2-N$ bilateral switches per converter.

Referring to FIG. 8, a UFC is now proposed in which the number of bilateral switches is substantially decreased. Each converter (CNV1, CNV2, or CNV3) has three (i.e. N) switches ($A_1$, $B_1$, $C_1$) at the input from the three input lines going to one end ($x_1$, $y_1$, $z_1$) of the corresponding output load (φA, φB or φC). The reduction appears with regard to the other end ($x_2$, $y_2$, $z_2$) of the output load. The latter has only two (i.e. (N−1)) bilateral switches associated thereto namely: (XY, XZ) for CNV1, (YZ, YX) for CNV2 and (ZX, ZY) for CNV3.

The following table expresses the sequence of operation of the bilateral switches in the UFC of FIG. 8:

TABLE II

|      | $T_1$ | $T_2$ | $T_3$ | $T_4$ | $T_5$ | $T_6$ |
|------|-------|-------|-------|-------|-------|-------|
| CNV1 | A1-XZ | A1-XY | B1-XZ | B1-XY | C1-XZ | C1-XY |
| CNV2 | C1-YX | C1-YZ | A1-YX | A1-YZ | B1-YX | B1-YZ |
| CNV3 | B1-ZY | B1-ZX | C1-ZY | C1-ZX | A1-ZY | A1-ZX |
| φA   | $V_{AB}$ | $V_{AC}$ | $V_{BC}$ | $V_{BA}$ | $V_{CA}$ | $V_{CB}$ |
| φB   | $V_{CA}$ | $V_{CB}$ | $V_{AB}$ | $V_{AC}$ | $V_{BC}$ | $V_{BA}$ |
| φC   | $V_{BC}$ | $V_{BA}$ | $V_{CA}$ | $V_{CB}$ | $V_{AB}$ | $V_{AC}$ |

It appears that one side of each of the three load terminals (X1, Y2, Z3) is switched to one of the input lines (via $A_1$, $B_1$, or $C_1$) at any time, whereas the other side of the load terminal is switched (via XY or XZ, YZ or YX, ZX or ZY) to a different input line.

Thus when $A_1$ of line $L_1$ to junction JA in the first converter is closed, with $C_1$ from line $L_3$ to junction JB in the second converter being closed and $B_1$ from line $L_2$ to junction JC in the third converter also being closed, while XZ, YX and ZY are closed, the following voltages are applied to the respective loads:

$V_A$ of junction JA is applied to end $x_1$ of load φA, while voltage $V_B$ from junction JC is being applied through XZ to end $x_2$ thereof. Similarly, voltage $V_C$ of junction JB is applied to end $y_1$ of load φB, while voltage $V_A$ is being applied through switch YX from junction JA to end $y_2$ thereof. Finally, voltage $V_B$ from junction JC is applied to end $x_1$ of load φC when voltage $V_C$ from junction $J_B$ goes to end $z_2$ via switch ZY. Thus, $(V_A - V_B)$ is on load φA, while $(V_C - V_A)$ is on load φB and $(V_B - V_C)$ on load φC. The line-to-neutral input voltages $V_A$, $V_B$, $V_C$ are applied to the respective loads as if they were connected end to end in a polygon. Actually, this is a true polygonal assembly, in both orders of succession of the loads, due to the pairing of the switches (XZ, XY), (YX, YZ), and (ZY, ZX) each switch in a pair being valid for one connection of the three phase load.

Generalizing to N-phase for the input lines and N loads symmetrically disposed, the invention requires N switches to select one end of each output phase, and there are N output phases. The total is $N^2$ for such one end. The other end of each output phase requires $(N-1)$ switches. Thus, for N output phases the total is $N(N-1)$. The overall total is $2N^2-N$, as opposed to $2N^2$ with the prior art UFC approach.

As shown in FIG. 4, voltage control is effected by establishing a duty cycle within the time interval T of sampling a particular voltage ($V_{AB}$, $V_{AC}$,...) during a time $t_1$ and by short-circuiting the load during a time $t_2=(T-t_1)$. In the prior art, such shorting was accomplished on a per-phase basis by closing any two switches in each bridge tied to the same input lines, while opening all the others.

Figure 9:
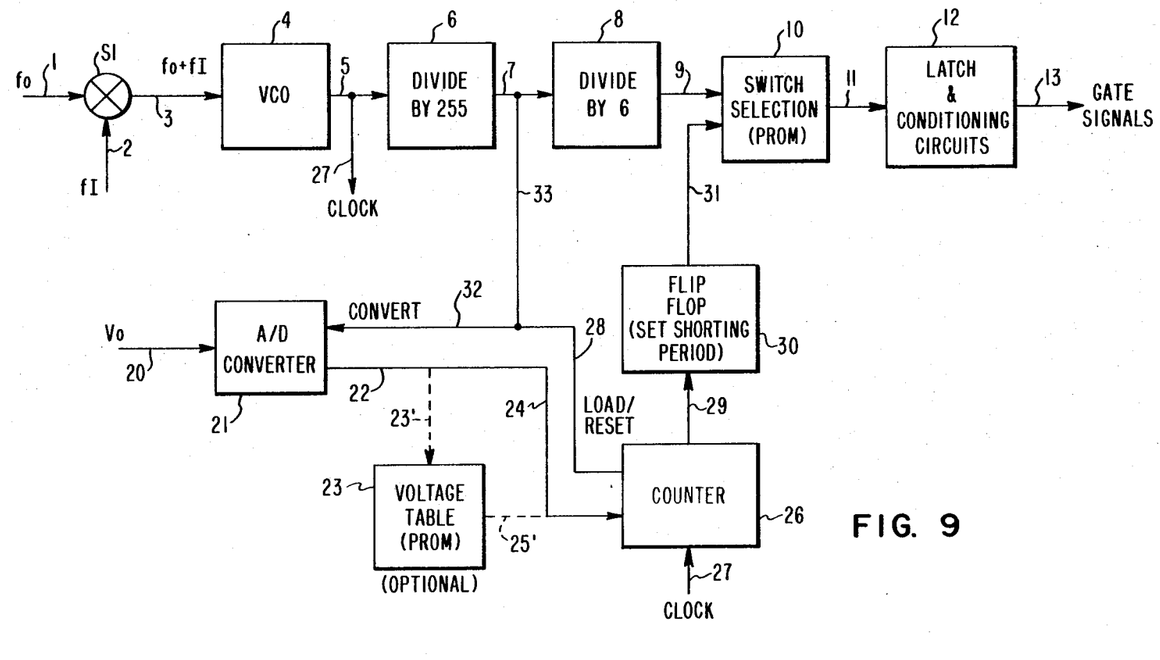
FIG. 9 shows in block diagram the control circuit associated with the UFC of FIG. 8.

The present invention allows shorting by a selection of switches with a substantial degree of freedom. Where, in the prior art the output phases would be shorted individually, here opening the three switches tied to the AC input and closing all six switches tied to the other end of the load (XY, XZ, YZ, YX, ZX, ZY) will suffice. This step may be repeated as many times as desired during each basic conduction interval. The sequence through a time period TP is illustrated, by reference to FIG. 8, by the following table:

which is in turn divided by 6 by a divider 8. Accordingly, as generally known from any of the afore-stated U.S. patents, the signal of line 9 establishes a series of successive time intervals like $T_1$-$T_6$ of FIG. 3. A PROM 10 contains the sequence of states applicable to the switches of FIG. 8, for instance as listed in TABLE II hereabove. The result is on lines 11 command signals for switches $A_1$-$C_1$ and XY to ZY of the respective converters of FIG. 8.

For voltage control, "shorting" intervals like shown in TABLE III are established by line 31 on to PROM 10. The distribution of such "shorting" time-intervals is in the PROM according to TABLE III, for instance, thus, in relation to the occurrence of one of the successive time intervals $T_1$-$T_6$ defined from line 9. The occurrence of the "non-shorting" ($t_1$) time intervals is timed by the clock signal derived from line 5 via line 27 and applied to a counter 26 which defines the duration of $t_1$. This time interval $t_1$ is controlled by the desired voltage $V_O$ at the output defined by a reference signal on line 20 to an A/D converter 21. The digital representation thereof, on line 24 is used to load counter 26. As an optional way of relating the voltage $V_O$ to the count defining $t_1$, a voltage table in the form of a PROM 23 can be used responding from lines 22 and 23' to the digital data from the A/D converter. The PROM 23, then, provides the load data to counter 26. A command on line 33 from counter 6 indicates the end of time $t_2$, initiates by line 32 a new conversion by A/D converter 21, and by line 28 loads new data into counter 26 for the subsequent period of conduction T. In order to provide an illustration of implementation, U.S. Pat. No.

TABLE III

| | $T_1$ | | $T_2$ | | $T_3$ | | $T_4$ | | $T_5$ | | $T_6$ | |
|---|---|---|---|---|---|---|---|---|---|---|---|---|
| | $t_1$ | $t_2$ | $t_1$ | $t_2$ | $t_1$ | $t_2$ | $t_1$ | $t_2$ | $t_1$ | $t_2$ | $t_1$ | $t_2$ |
| CNV1 | (A1,XZ) | (XZ,XY) | (A1,XY) | (XY,XZ) | (B1,XZ) | (XZ,XY) | (B1,XY) | (XY,XZ) | (C1,XZ) | (XZ,XY) | (C1,XY) | (XY,XZ) |
| CNV2 | (C1,YX) | (YX,YZ) | (C1,YZ) | (YZ,YX) | (A1,YX) | (YX,YZ) | (A1,YZ) | (YZ,YX) | (B1,YX) | (YX,YZ) | (B1,YZ) | (YZ,YX) |
| CNV3 | (B1,ZY) | (ZY,ZX) | (B1,ZX) | (ZX,ZY) | (C1,ZY) | (ZY,ZX) | (C1,ZX) | (ZX,ZY) | (A1,ZY) | (ZY,ZX) | (A1,ZX) | (ZX,ZY) |
| φA | $V_{AB}$ | 0 | $V_{AC}$ | 0 | $V_{BC}$ | 0 | $V_{BA}$ | 0 | $V_{CA}$ | 0 | $V_{CB}$ | 0 |
| φB | $V_{CA}$ | 0 | $V_{CB}$ | 0 | $V_{AB}$ | 0 | $V_{AC}$ | 0 | $V_{BC}$ | 0 | $V_{BA}$ | 0 |
| φC | $V_{BC}$ | 0 | $V_{BA}$ | 0 | $V_{CA}$ | 0 | $V_{CB}$ | 0 | $V_{AB}$ | 0 | $V_{AC}$ | 0 |

This control scheme allows readily the use of the PWM control approaches to improve a UFC which have been disclosed in U.S. Pat. Nos. 4,488,216 and 4,581,696.

It is observed that the Table III method of voltage control with "shorting" intervals is not the only one possible with the arrangement of FIG. 8. For example, the same result can be obtained by closing, on one side only, the three line connected switches associated with the same input line for the respective converters (the three $A_1$, $B_1$, or $C_1$ switches), while closing either the set XY, YZ and ZX, or the set XZ, ZY and YX, on the other side of the output loads.

There are more ways of combining the status of the N switch group with the status of the $(N-1)$ switch group to achieve a short-circuit between the terminals of the output loads.

Referring to FIG. 9 control of the UFC of FIG. 8 is shown illustratively by a block diagram.

Summer S1 responds to the requested output frequency command $f_O$ on line 1, and to the input frequency $f_I$ on line 2, to provide on line 3 a signal representative of ($f_O+f_I$), i.e. the sampling frequency. A voltage controlled oscillator 4 translates the signal of line 3 into a pulse train, appearing on line 5, which is passed through a divide by 255 circuit 6, the output of 4,581,696 issued Apr. 8, 1986 is hereby incorporated by reference, in particular with regard to the implementation shown in FIG. 32 thereof.

I claim:
1. In a UFC bridge system including a plurality of bilateral power switches operated in a repetitive switching pattern at a selected repetition rate to apply successive increments of alternating voltage from a N-phase voltage source to supply N output loads with current at an output frequency which is a function of the difference between the input frequency and said repetition rate, the combination of:

N groups of N of said switches, each of said N groups being associated with one end of a corresponding one of said N output loads and with the respective N phases of said voltage source;

N groups of $(N-1)$ additional said switches, each of said $(N-1)$ additional switches being connected to a corresponding said one end for an output load belonging to the $(N-1)$ other groups of N switches, and each of said N groups of $(N-1)$ additional switches being associated with the other end of a corresponding one of said N output loads; whereby said output loads form through said $(N-1)$ additional switches a polygonal assembly of said output loads, and said polygonal assembly is connected selectively to the respective phases of said voltage source by selective control of said N groups of N switches.

2. The system of claim 1, wherein one switch in each of said N groups of N switches is controlled for conduction, and one switch in each of said N groups of (N−1) switches is controlled for conduction concurrently therewith; whereby such one switch among (N−1) switches closes a current path through a corresponding load between one pair of switches of different groups of N switches.

3. The system of claim 2 with the switches of one N switch group and the switches of an (N−1) switch group relating to a common one of said loads being controlled as one AC converter between said AC voltage source and such load; each of said converters being operated in relation to the associated load for connection between one switch of the N switch group of such converter and one switch of the N switch group of another converter.

4. The system of claim 3 with each of said converters being controlled in parallel to establish conduction of said N group of switches in succession during a time period characterizing the frequency $f_o$ of the AC power to the loads;

each switch having a controllable conduction time interval (t) within a common time frame (T) defined by a controllable repetition rate;

thereby to derive energy from said AC voltage source through the associated converters during successive segments of voltage, on a phase basis, and to apply the derived voltage segments of said succession to said loads, so as to form with the associated converter switches an AC polyphase load.

5. The system of claim 4 with said time interval of conduction being defined by a complementary time of short-circuiting said loads during such common time frame (T).

6. The system of claim 5 wherein said short-circuiting is effected by turning OFF the switches of the associated N group of switches and by turning ON concurrently all switches of said (N−1) switch groups.

7. The system of claim 5 wherein said short-circuiting is effected by turning ON all the switches associated with the same input phase in said groups of N switches, and by turning ON at least one switch in each of said (N—1) switch groups.

* * * * *